No. 608,641. Patented Aug. 9, 1898.
A. J. BLACKWOOD.
ATTACHMENT FOR TOPS OF VESSELS USED IN MAKING TEA OR COFFEE, &c.
(Application filed Dec. 18, 1897.)
(No Model.)
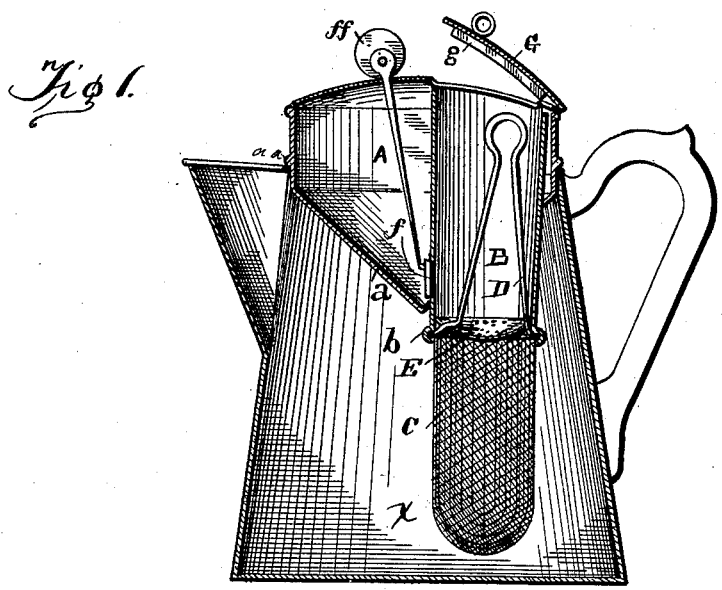
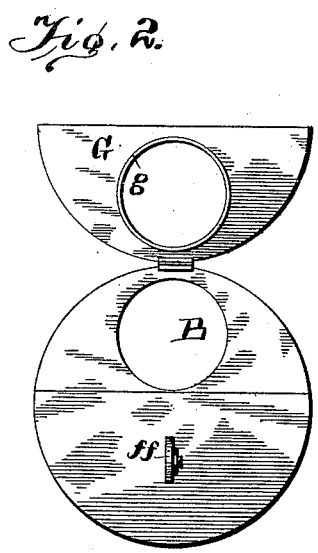
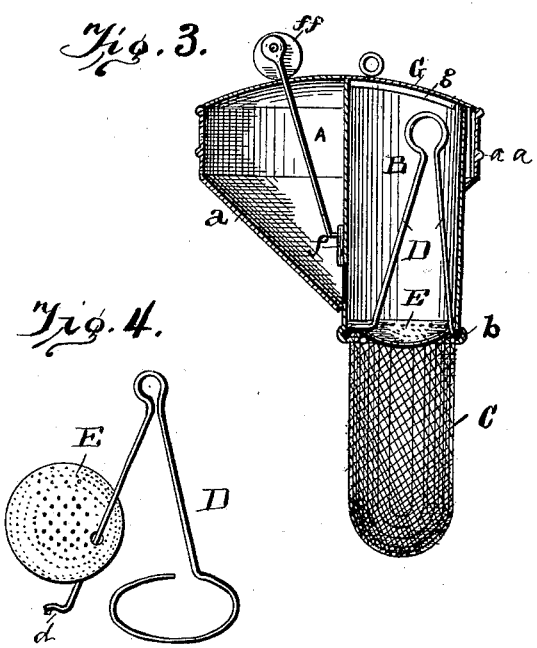
WITNESSES:
Chas. K. Davies.
Robt. H. Payne.
INVENTOR
A. J. Blackwood
BY W. H. Bartlett
ATTORNEY.

UNITED STATES PATENT OFFICE.

ANDREW J. BLACKWOOD, OF STERLING, KANSAS.

ATTACHMENT FOR TOPS OF VESSELS USED IN MAKING TEA OR COFFEE, &c.

SPECIFICATION forming part of Letters Patent No. 608,641, dated August 9, 1898.

Application filed December 18, 1897. Serial No. 662,444. (No model.)

*To all whom it may concern:*

Be it known that I, ANDREW J. BLACKWOOD, of the city of Sterling, county of Rice, and State of Kansas, have invented an Improvement in a certain new and useful Attachment to be Used in the Top of any Coffee or Tea Making Vessel as a Cover; and I do hereby declare the following to be a full, clear, and exact description thereof, reference being had to the accompanying drawings, making part of this specification.

My invention relates to certain new and useful improvements in an attachment to be used in the top of any coffee or tea making vessel as a cover in which is provided a condensing-chamber and filter with a cut-off valve; and it has for its object, among others, to provide an attachment for a coffee or tea making vessel which shall be easy to operate and inexpensive to manufacture and by the use of which the strength of the ground coffee or tea will all pass into the liquid, it retaining all the strength, oil, and flavor, making it clear and free from all sediments and giving it a most excellent flavor.

My improvement is an attachment to be used in the making of coffee or tea; and it consists of a cover, condenser, and filter, and I provide above the vessel to be used, in which it is placed, where vapor or steam will be formed, a condensing-chamber having a cone-shaped bottom, so that it can be used in the various styles of vessels used in the making of coffee or tea. It also increases the condensing-surface, so that all the vapor or steam arising from the liquid after it passes through the filter and into the vessel is condensed on said bottom and returned direct to the liquid and not through the ground coffee to be absorbed. The device also prevents the vapor or steam from escaping out through the spout or other opening in the vessel.

The cover is provided with a filter which is composed of two sections, the first or upper section being a tube or hot-water chamber which commences at or near the top of the condensing-chamber and extends downward and through one side of the cone-shaped bottom, to which it is attached, and has a grooved bottom or beaded flange at or near the lower end, which receives and supports the lower section. The lower section is made of the proper filtering material and is provided with and attached to a combined circular spring, which forms a handle, and brace-spring, with notch at or near the lower end of the same. By the use of said spring the lower section is firmly and tightly held in and suspended from the groove-shaped or beaded flange, so that no sediment can pass into the vessel.

The filter and condensing-chamber are provided with a cut-off valve to permit the water to pass from the condensing-chamber into the filter at will, and, cooling coffee as desired, it also increases the condensing powers of the upper walls of the filtering-chamber, so that all steam or vapor arising from the ground coffee is condensed and returned to liquid.

The condenser and filter are provided with an opening and cover for same.

Other objects and advantages of my improved and useful attachment will hereinafter appear, and the novel features thereof will be specifically defined by the appended claims.

The invention is clearly illustrated in the accompanying drawings, which, with the letters of reference marked thereon, form a part of this specification, and in which—

Figure 1 is a substantially central vertical section through my invention as used in one of the various styles of vessels. Fig. 2 is a top view of my invention, showing the opening to the condensing-chamber and filter with cover for same. Fig. 3 is a substantially central vertical sectional view of my invention as an attachment. Fig. 4 is a view of the combined spring, which forms a handle, and brace-spring, with notch $d$, and the concave strainer E, attached thereto.

Like letters of reference indicate like parts in all views.

Referring now to the details of the drawings by letters, X designates one of the various styles of vessels in which coffee or tea is made.

A is the condensing-chamber, with the beaded flange or step $a\ a$, that rests on the upper edge of the body of the vessel as a cover, (shown in Fig. 1,) and it also has an inclined bottom $a$, so that it can be used in variously-formed vessels. The device also has the upper section-tube or hot-water chamber of the filter B, which commences at or near the top and extends downward through and attaches to an inclined bottom a, and is provided with a groove or beaded flange b, from which is suspended the lower section of filter C by the circular combined and brace spring D with notch d, as shown in Fig. 4. Spring D is attached to the upper end or mouth of C, which it firmly and tightly holds in groove or beaded flange b, as shown in Figs. 1 and 3, thereby preventing all sediment passing around it into the vessel. The combined spring D also forms a handle by which filter C and strainer E can be drawn up and through chamber B for the purpose of cleaning or filling.

E is a concave strainer that is attached to and held in place by spring D when in use, as shown by Figs. 1 and 3.

A and B are provided with an opening, as shown in Fig. 2, and a cover G, which has a downward-extending flange g, is designed to fit snugly into the upper end of B, as shown by Figs. 1, 2, and 3.

Chambers A and B are provided with a cut-off valve F, with opening f and shield or guard for stem of same, thereby keeping the valve from being moved out of its place, the valve being closed in Fig. 1 and open in Fig. 3.

With the parts constructed and arranged substantially as above set forth the operation is as follows: The combination lid or attachment, as shown by Fig. 3, is fitted into a vessel, as shown by Fig. 1, the cover G being open, as shown in Fig. 2. The filter and strainer are removed by taking hold of the handle and drawing it up and through the chamber B, then removing strainer E, as shown by Fig. 4, placing coffee in C, and placing E in position, then by means of the handle and brace-spring, with notch d, (which is placed on the upper rim of filter C,) forcing the filter down to position in the vessel, as shown by Fig. 1. After placing cold water or other condensing material into the chamber A pour poiling water into the chamber B, which falls into the strainer E and filters through the ground coffee and passes into the vessel. When boiling water has been introduced, the cover G should be closed and the cut-off valve should be opened, as in Fig. 3, so as to enable the cold water to pass from the condensing-chamber A to chamber B and over and through strainer E and into filter C, so as to enable the upper inside walls of B to condense all the steam or vapor that may arise from the ground coffee and return it again through the filter by the aid of the drip. After the water has all passed out of the chamber B and through the filter C into the vessel the valve F should be closed, unless to cool the coffee, as desired, as all vapor arising from the liquid in the vessel is condensed on the bottom a and returned direct to the liquid.

Having thus described my attachment to be used in any vessel for the making of coffee or tea, what I claim as new is—

1. An attachment for tea and coffee pots, consisting essentially of an insertible vessel with suitable supporting device, said insertible vessel having an inclined bottom, a tube extending through said bottom, and a filter supported by an elastic ring near the bottom of said tube, and removable through the mouth of the tube by compressing said ring, substantially as described.

2. The attachment for tea and coffee pots, consisting essentially of an insertible vessel with inclined bottom, an interior tube passing through said bottom and provided with a side valve, covering an opening from the tube to the inclined-bottom vessel, and a filter removably connected to said tube so as to be removable therethrough, substantially as described.

3. In a teapot attachment, the insertible inclined-bottom vessel, the tube extending through such bottom, the spring-ring having a handle connected thereto, the filter connected to said spring-ring, and the strainer connected to the handle of the said spring-ring, all combined substantially as described.

ANDREW J. BLACKWOOD.

Witnesses:
H. L. TRUESDELL,
JOHN ANTROBUS.